United States Patent [19]

Hokamura et al.

[11] Patent Number: 4,505,954
[45] Date of Patent: Mar. 19, 1985

[54] PROCESS FOR FORMING A CORROSION RESISTANT HIGH-BUILD TYPE COATING

[75] Inventors: Sadakazu Hokamura, Yamato; Toshio Shinohara; Ryoichi Nomura, both of Yokohama; Mitsutoshi Aritomi; Yuji Yoshida, both of Ibaraki, all of Japan

[73] Assignees: Dai Nippon Toryo Co., Ltd., Osaka; Mitsubishi Yuka Fine Chemicals Co., Ltd., Tokyo, both of Japan

[21] Appl. No.: 559,371

[22] Filed: Dec. 8, 1983

[30] Foreign Application Priority Data

Dec. 28, 1982 [JP] Japan ................................ 57-229953

[51] Int. Cl.³ ......................... B05D 1/36; B05D 2/00; B05D 3/02
[52] U.S. Cl. ................................. 427/380; 427/407.1; 427/409; 525/18
[58] Field of Search ...................... 427/380, 409, 407.1; 525/18

[56] References Cited

U.S. PATENT DOCUMENTS 4,139,672 2/1979 Ozawa et al. .................. 427/409 X
4,359,504 11/1982 Troy ............................... 427/409 X

FOREIGN PATENT DOCUMENTS 77234 7/1978 Japan .................................. 427/409

Primary Examiner—Michael R. Losignan
Attorney, Agent, or Firm—Oblon, Fisher, Spivak, McClelland & Maier

[57] ABSTRACT

A process for forming a corrosion resistant high-build type coating, which comprises (i) a step of priming on a substrate a coating composition comprising (a) 100 parts by weight of a mixture composed of from 99.9 to 60% by weight of a vegetable oil and/or a phthalic alkyd resin, and from 0.1 to 40% by weight of tricyclodecene and/or its derivative, and (b) from 1 to 500 parts by weight of at least one member selected from the group consisting of an oxyacid salt, and metal lead and its oxide and salt, followed by drying it to form a prime coat, and (ii) a step of applying thereon a radical-polymerizable and oxidation-polymerizable, room temperature curing type solventless coating composition, and polymerizing it to form a cured coating film.

7 Claims, No Drawings

PROCESS FOR FORMING A CORROSION RESISTANT HIGH-BUILD TYPE COATING

The present invention relates to a process for forming a corrosion resistant coating. More particularly, the present invention relates to a process for forming a corrosion resistant coating, which comprises applying a specific primer coating composition onto a substrate and drying it to form a prime coat, and then finish-coating a solventless coating composition thereon.

For the protection of substrates such as tanks, bridges, steel-frame structures or pipes which need to be protected for a long period of time, various solvent-type and solventless coating compositions have been employed in various combinations for the primer coating and finish coating of such substrates.

For instance, taking into consideration the selectivity to the primer, etc., various combinations of coating compositions, such as oil type coating composition/phenol resin type coating composition/chlorinated rubber type coating composition, organic or inorganic zinc-rich paint/chlorinated rubber type coating composition, epoxy resin type coating composition/polyurethane type coating composition, and epoxy resin type coating composition/epoxy resin type coating composition, have been employed for the coatings.

In recent years, there has been an increase of corrosion factors attributable to e.g. air pollution. To cope with this problem, there is a strong demand for coating compositions or coating systems having improved corrosion resistance.

On the other hand, a so-called oil-type or phthalic alkyd resin type coating composition comprising a vegetable oil, a phthalic alkyd resin or a mixture thereof, has been practically used since long ago. Such a coating composition has various merits which are not obtainable by other synthetic resin type coating compositions. For instance, it excels in the coating workability; it is possible to use a thinner which is almost harmless; the surface treatment of the substrate which usually requires the greatest costs and number of process steps in the coating process, may relatively be rough; and the coating composition is relatively inexpensive.

In general, the corrosion resistance of a coating film is proportional to the thickness of the coating film. In the case of the above-mentioned oil-type or phthalic alkyd resin type coating composition, however, the film thickness obtainable by a single application is only 40 $\mu$m at best, and accordingly it used to be required to repeat the coating operation as many times as from 4 to 5 times to obtain a prescribed thickness necessary for the protection of metal.

Furthermore, when applied, the oil-type coating composition or the phthalic alkyd resin coating composition absorbs oxygen from air and is hardened by an oxidation-polymerization reaction to form a hardened coating film. Accordingly, the hardening of the coating starts from the coating surface which is in direct contact with air and gradually proceeds inwardly of the coating. In this case, if the coating thickness is excessive, only the surface layer will be hardened and the hardening of the internal portion of the coating will be substantially delayed, whereby there will be a substantial difference in the degree of the hardening between the surface portion and the inner portion of the coating and the coating surface tends to have wrinkles. Thus, it will be impossible to obtain a predetermined anti-corrosive effect and finishing quality required for the coating film.

Further, the coating film obtainable by a conventional oil-type coating composition tends to cause "lifting", and accordingly the finish coating composition to be used has been rather restricted. Further, when the finish coating composition contains a solvent which is likely to cause "lifting", it is necessary to take a certain measure, for instance, to apply an intermediate coating of e.g. a phenol resin coating composition containing a micaceous iron oxide pigment. Thus, an additional coating operation is thereby required, which adds to the coating costs.

Under these circumstances, it is strongly desired to develop a primer coating composition in which an oil-type coating composition or a phthalic alkyd resin coating composition having excellent coating workability is used and which is capable of providing a high-build type coating film having a dried film thickness of from 50 to 200 $\mu$m by a single application and yet capable of permitting adequate internal hardening to form a satisfactory primer coating which is free from undergoing "lifting". Likewise, it is strongly desired to develop a finish coating composition having excellent corrosion resistance which can be applied directly on the coating film of the oil-type or phthalic alkyd resin type coating composition and which is capable of providing a high-build coating film having a dried film thickness of from 50 to 300 $\mu$m by a single application.

Accordingly, it is an object of the present invention to provide a process for forming a coating film having superior corrosion resistance and to reduce the cost for the coating operation by using a primer coating composition which retains the merit of the conventional coating composition such as the coating workability and simple surface treatment of the substrate and yet is capable of providing a high-build coating by a single application without bringing about drying deficiency of the internal portion of the coating or the formation of wrinkles on the coating surface and which does not require a special intermediate coating to prevent "lifting", and a solventless finish coating composition having superior corrosion resistance which is capable of providing a high-build coating by a single application.

Namely, the present invention provides a process for forming a corrosion resistant high-build type coating film, which comprises (i) a step of priming on a substrate a coating composition comprising (a) 100 parts by weight of a mixture composed of from 99.9 to 60% by weight of a vegetable oil and/or a phthalic alkyd resin, and from 0.1 to 40% by weight of tricyclodecene and/or its derivative, and (b) from 1 to 500 parts by weight of at least one member selected from the group consisting of an oxyacid salt, and metal lead and its oxide and salt, followed by drying it to form a prime coat, and (ii) a step of applying thereon a radical-polymerizable and oxidation-polymerizable, room temperature curing type solventless coating composition, and polymerizing it to form a cured coating film.

In the process of the present invention, the vegetable oil to be used as the vehicle for the primer coating composition is an esterification reaction product of various fatty acids with glycerol.

As the vegetable oil to be used in the present invention, there may be mentioned, for instance, linseed oil, Chinese tung oil, soybean oil, cotton seed oil, rice bran oil, peanut oil, olive oil, castor oil, coconut oil, rapeseed oil, corn oil and sesame oil. Among them, linseed oil, soybean oil and Chinese tung oil being dry oils having iodine value of 120 are most preferred from the viewpoint of drying efficiency of the coating. The above-mentioned vegetable oil includes blown oil and a thermopolymerized oil obtained by subjecting a natural oil to an oxidation reaction or polymerization to some extent.

The phthalic alkyd resin to be used in the present invention is a resin having an oil length of from 40 to 80% which is obtainable by esterifying a polyhydric alcohol, a polybasic acid (which may, if necessary, contain a monobasic acid to some extent) and a fatty acid by a conventional method.

As the polyhydric alcohol, there may be mentioned, for instance, ethylene glycol, diethylene glycol, triethylene glycol, propylene glycol, dipropylene glycol, butanediol-1,3, butanediol-1,4, butanediol-2,3, pentanediol-1,5, hexanediol-1,6, neopentyl glycol, 2,2,4-trimethyl-pentanediol-1,3, hydrogenated bisphenol A, 2,2-di(4-hydroxypropoxyphenyl)propane, glycerol, pentaerythritol, diallyl ether, trimethylene glycol, 2-ethyl-1,3-hexanediol, trimethylol propane, cyclohexane dimethanol-1,4, 2,2,4-tetramethylcyclobutanediol-1,3,1,4-bis(2-oxyethoxy)benzene, and 2,2,4,4-tetramethylcyclobutanediol-1,3. These alcohols may be used alone or in combination as a mixture.

The polybasic acid to be used for the preparation of the phthalic alkyd resin may be a saturated or unsaturated polybasic carboxylic acid or its anhydride, such as maleic acid, fumaric acid, itaconic acid, citraconic acid, mesaconic acid, maleic anhydride, phthalic anhydride, isophthalic acid, terephthalic acid, hexahydrophthalic anhydride, tetrahydrophthalic anhydride, tetrabromophthalic anhydride, tetrachlorophthalic anhydride, chlorendic acid, 3,6-endomethylene-tetrahydrophthalic anhydride, trimellitic anhydride, pyromellitic anhydride, methylnadic acid, succinic acid, adipic acid, sebacic acid, azelaic acid, an anthrathrene-maleic anhydride adduct and a rosin-maleic anhydride adduct. These acids and anhydrides may be used alone or in combination as a mixture.

In the present invention, it is particularly preferred to employ phthalic acid alone or a combination of phthalic anhydride as the main component with other acid components. Further, these polybasic acid may be used in combination with a monobasic acid such as benzoic acid or p-tert-butylbenzoic acid, as the case requires.

As the above-mentioned fatty acid, there may be mentioned, for instance, linseed oil fatty acid, Chinese tung oil fatty acid, soybean oil fatty acid, cotton seed oil fatty acid, rice bran oil fatty acid, peanut oil fatty acid, olive oil fatty acid, castor oil fatty acid, coconut oil fatty acid and palm oil fatty acid.

The esterification reaction to obtain the phthalic alkyd resin from the above-mentioned polyhydric alcohol, polybasic acid and fatty acid, is usually conducted at a temperature of from about 150° to 280° C., while removing water which forms during the reaction. The completion of the reaction is determined by measuring the amount of water formed by the esterification reaction or the acid value.

From the viewpoint of the coating film properties, the acid value at the completion of the reaction is preferably at most 50.

The primer coating composition to be used for forming the primer coating layer of the present invention, may contain the above-mentioned vegetable oil or the phthalic alkyd resin alone or may contain both of them in an optional proportion.

When the phthalic alkyd resin is used alone, the phthalic anhydride content is preferably at most 30% by weight, more preferably at most 25% by weight. When it is used to combination with a vegetable oil, it is desirable to adjust the mixing ratio so that the phthalic anhydride content in the mixture is at most 30% by weight, more preferably at most 25% by weight.

In the present invention, if the phthalic anhydride content in the phthalic alkyd resin or in the mixture of the vegetable oil and the phthalic alkyd resin exceeds 30% by weight, it becomes difficult to obtain the drying efficiency of the high-build coating by the addition of tricyclodecene and/or its derivative, which will be described hereinafter, and it is likely to lead to degradation of the coating film properties.

The above-mentioned tricyclodecene and its derivative to be used in the present invention are represented by the following structural formulas:

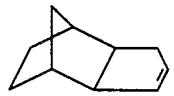

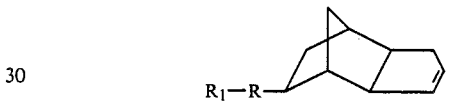

where R is a residual group obtained by removing H from each of at least to OH groups of the alcohol in the polybasic alcohol, and $R_1$ is a residual group obtained by removing OH from at least 1 carboxyl group in the carboxylic acid.

The above-mentioned R includes residual groups of e.g. glycerol, trimethylolethane, trimethylolpropane, pentaerythritol, diglycerol, ethylene glycol, propylene glycol, 1,3-butylene glycol, butanediol, neopentyl glycol, diethylene glycol, dipropylene glycol, bisphenoldioxyethyl ether and bisphenoldioxypropyl ether.

The above-mentioned $R_1$ includes residual groups of e.g. acetic acid, propionic acid, butyric acid, caproic acid, stearic acid, crotonic acid, linolic acid, glycolic acid, oxalic acid, succinic acid, maleic acid, fumaric acid, resorcinic acid, dioxybenzoic acid, naphthoic acid, gallic acid, phthalic acid, trimellitic acid, pyromellitic acid, acrylic acid, methacrylic acid, monomethyl maleate, monoethyl maleate, monopropyl maleate, monooctyl maleate, monomethyl fumarate, monoethyl fumarate, monopropyl fumarate, monomethyl itaconate and monoethyl itaconate.

As is evident from the above chemical structural formula, the polyhydric alcohol residual group (R) in the tricyclodecene derivatives is linked to cyclodecene by an ether bond. On the other hand, it is linked to the carboxylic acid by an ester bond.

Specifically, there may be mentioned a methacrylate ester of ethylene glycol monodicyclopentenyl ether (i.e. dicyclopentenyl oxyethyl methacrylate), an acrylate ester of ethylene glycol monodicyclopentenyl (i.e. dicyclopentenyl oxyethyl acrylate), a methacrylate ester of neopentyl glycol monodicyclopentenyl ether, an acrylate ester of neopentyl glycol monodicyclopentenyl ether, a methacrylate ester of 1,2-propylene glycol monodicyclopentenyl ether, a methacrylate ester of 1,3-butylene glycol monodicyclopentenyl ether, a methacrylate ester of 1,6-hexanediol monodicyclopentenyl ether, a methacrylate ester of diethylene glycol monodicyclopentenyl ether.

As the tricyclodecene derivatives, compounds represented by the following structural formula may also be employed:

where $R_2$ is a residual group of a carboxylic acid such as acrylic acid, methacrylic acid or crotonic acid. Specifically, there may be mentioned dicyclopentenyl acrylate and dicyclopentenyl methacrylate.

The vegetable oil and/or phthalic alkyd resin is mixed with tricyclodecene and/or its derivative in such a proportion that the former constitute from 99.9 to 60% by weight, preferably from 98 to 80% by weight, whereas the latter constitutes from 0.1 to 40% by weight, preferably from 2 to 20% by weight. If the amount of tricyclodecene and/or its derivative is less than 0.1% by weight, no adequate effectiveness of the addition is obtainable. On the other hand, if the amount exceeds 40% by weight, the coating film properties will be substantially degraded and the costs of the coating composition will be increased, whereby the value as an industrial product will be reduced.

As the oxyacid salts to be used for the primer coating composition of the present invention, there may be employed various salts composed of various metal and oxyacids such as chromic acid, phosphoric acid (including condensed phosphoric acids), boric acid, molybdic acid, phosphomolybdic acid, silicomolybdic acid, tungstic acid, phosphotungstic acid, silicotungstic acid and sulfuric acid. More specifically, there may be mentioned strontium chromate, calcium chromate, lead chromate, zinc chromate, zinc molybdate, calcium molybdate, pottasium molybdate, zinc tungstate, calcium tungstate, magnesium tungstate, zinc phosphate, lead orthophosphate, lead pyrophosphate, lead metaphosphate, aluminum phosphate, tin orthophosphate, tin pyrophosphate, tin oxyphosphate, zinc tetraborate, zinc metaborate, lead metaborate, lead tetraborate, barium metaborate, lead sulfate and lead (IV) sulfate.

As the above-mentioned component of metal lead and its oxides or salts, to be used for the primer coating composition of the present invention, there may be mentioned, as the representative examples, metal lead, lead suboxide, lead monoxide, lead dioxide, trilead tetraoxide, white lead, lead cyanamide, calcium plumbate, basic lead sulfate and basic lead chromate.

In the present invention, at least one component (anti-corrosive pigment component) selected from the group consisting of an oxyacid salt, and metal lead and its oxide and salt, preferably comprises, as the oxyacid salt, a component obtainable from phosphoric acid, boric acid, molybdic acid or chromic acid and zinc, lead or aluminum, and as the metal lead or its oxide or salt, at least one component selected from the group consisting of metal lead, lead suboxide, lead monoxide, lead dioxide, trilead tetraoxide, white lead, lead cyanamide, calcium plumbate, basic lead sulfate and basic lead chromate, as essential components, whereby the drying efficiency of a high-build coating film can be effectively improved. The mechanism of the improvement is not clearly understood. However, it is considered that metal ions formed in the coating somehow provide a catalytic effect for the oxidation-polymerization of the tricyclodecene and/or its derivative.

In the present invention, the above-mentioned anti-corrosive pigment component, i.e. the oxyacid salt, metal lead or its oxide or salt, is incorporated in an amount of from 1 to 500 parts by weight, preferably from 30 to 450 parts by weight, based on 100 parts by weight of a mixture comprising from 60 to 99.9% by weight of a vegetable oil and/or phthalic alkyd resin and from 40 to 0.1% by weight of tricyclodecene and/or its derivative. If the anti-corrosive pigment component exceeds 500 parts by weight, the object of the present invention will not be attained and the physical properties of the coating film tends to be inferior.

To the primer coating composition of the present invention, there may be incorporated other pigment commonly employed as coating pigments, for example, a coloring pigment such as iron oxide, titanium dioxide, chrome yellow, carbon black, phthalocyanine blue or zinc dioxide, and a filler pigment such as calcium carbonate, precipitated barium sulfate, calcium silicate, barium carbonate, talc, clay, mica or silica.

Further, in the process of the present invention, the composition to be used for the formation of the primer coating layer, contains a so-called drier(metallic soap) such as cobalt naphthenate, lead naphthenate, manganese naphthenate or calcium naphthenate, since the step of drying the coating involves oxidation-polymerization. Further, a surface regulating agent, an anti-sagging agent, an anti-settling agent, an anti-skinning agent, a surface active agent or a solvent such as toluene, xylene, mineral spirit, hexane, naphtha or nitropropane, may also be added to the composition.

The primer coating composition may be prepared by mixing the above-mentioned essential components and other optional additives and solvents in accordance with a conventional method, for instance, by using a disperser, a roll mill, a sand mill or a ball mill.

In the process of the present invention, firstly the above-mentioned primer coating composition is applied on a substrate such as a metal surface of various steel sheets, which has been preliminarily cleaned or coated with a shop primer. As the coating method, a conventional method such as brush coating, roller coating, air spray coating or airless spray coating, may be employed. Then, the applied coating is dried at room temperature or by an accelerated drying operation. The dried film thickness of the prime coat is from about 30 to 300 μm, preferably from 50 to 200 μm.

The primer coating composition of the present invention has a feature that even when it is applied to form a coating having an average dried film thickness of from about 50 to 200 μm in a single application operation, there will be no internal drying defect or no abnormality on the surface.

Accordingly, a sufficient film thickness may be obtained even by a single application operation although the application of the primer coating composition may be repeated 2 times or more.

The radical-polymerizable and oxidation-polymerizable, room temperature curing type solventless coating composition to be used in the present invention may most preferably be a composition which is composed essentially of a curing catalyst and a resin component comprising (A) from 30 to 70% by weight of an oil-modified alkyd resin having an oil length of from 30 to 70% and modified with an α,β-unsaturated monocarboxylic acid selected from the group consisting of sorbic acid, crotonic acid and 2-(β-furyl)acrylic acid, the content of the α,β-unsaturated monocarboxylic acid in the alkyd resin being from 0.5 to 30% by weight, and (B) from 70 to 30% by weight of a polymerizable monomer in which the ingredient (A) is dissolved.

This composition to be used in the process of the present invention is curable by room temperature drying or accelerated drying to form a coating film which is superior in the surface smoothness, hardness, bending resistance, impact resistance and water resistance.

Ingredient (A): oil-modified alkyd resin modified with an unsaturated carboxylic acid The ingredient (A) as set forth above is substantially the same as oil-modified alkyd resins which are known heretofore or may be provided in the future except that it has been modified with a specific α,β-unsaturated monocarboxylic acid. The method by which this modification with the α,β-unsaturated monocarboxylic acid is carried out is also the same as the ordinary method of modifying an alkyd resin with a fatty acid.

Accordingly, examples of the polybasic acid of the alkyd resins are aromatic, aliphatic or alicyclic saturated polybasic acids such as phthalic anhydride, isophthalic acid, tetrahydrophthalic anhydride, adipic acid, sebacic acid, azelaic acid, branched 1,2,3,6-tetrahydrophthalic anhydride derivatives which are Diels-Adler adducts of an isoprene dimer having conjugated double bonds and maleic anhydride such as maleinated myrcene, maleinated alloocimene, maleinated ocimene, 3-(β-methyl-2-butenyl)-5-methyl-1,2,3,6-tetrahydrophthalic acid or anhydride thereof, hexahydrophthalic anhydride, 4-methyl-tetrahydrophthalic anhydride, trimellitic acid, and mixtures of two or more of these acids.

Within limits wherein gelation will not occur, a part of given saturated polybasic acid such as the one mentioned above may be substituted by an unsaturated polybasic acid such as, for example, maleic acid, maleic anhydride, fumaric acid, and itaconic acid. Of these, a particularly preferred polybasic acid is a combination of phthalic acid and 3-(β-methyl-2-butenyl)-5-methyl-1,2,3,6-tetrahydrophthalic anhydride (hereinafter referred to by the abbreviation MBTHP). When MBTHP is used in the polybasic acid, it has a remarkable effect in lowering the viscosity of the alkyd resin.

Examples of polyhydric alcohols which can be used for the polyhydric alcohol ingredient are ethylene glycol, diethylene glycol, propylene glycol, dipropylene glycol, 1,4-butanediol, neopentyl glycol, glycerol, pentaerythritol, trimethylol propane, trimethylolethane, tris(2-hydroxyethyl)isocyanurate, and mixtures of two or more of these alcohols. In general, dihydric, trihydric and tetrahydric alcohols of from 2 to 12 carbon atoms are usually preferable.

For the fat, oil, or fatty acid for forming the oil-modified alkyd resin, those which can be dried in air are used, examples being oils and fats such as linseed oil, soybean oil, tall oil, and safflower oil, dehydrated castor oil or fatty acids separated from these oils. Particularly desirable fatty acids are dehydrated castor oil fatty acid and safflower oil fatty acid containing more than 60 mole percent in the fatty acid moiety of linoleic acid and linolenic acid independently or as a mixture system.

According to this invention, the oil-modified alkyd resin comprising the above described three indispensable ingredients is further modified with an α,β-unsaturated monocarboxylic acid. α,β-Unsaturated monocarboxylic acids which are suitable for use in this invention are crotonic acid, sorbic acid, and 2-(β-furyl) acrylic acid, as mentioned hereinbefore, sorbic acid being particularly preferable. Since this acid undergoes radical copolymerization with the ingredient (B) in the composition of this invention and thereby contributes to hardening of the formed film, it is highly effective particularly for improving the hardness and the water resistance of the formed coating film.

Of these four indispensable ingredients, the oil-modified alkyd resin is prepared by an ordinary process. Specific examples are the process wherein the α,β-unsaturated monocarboxylic acid, the fatty acid, the polybasic acid, and the polyhydric alcohol are simultaneously charged into the reaction system and caused to react, and the process in which the fatty acid, the polybasic acid, and the polyhydric alcohol are first caused to react, and then the α,β-unsaturated monocarboxylic acid is caused to react with these reactants. The latter process is desirable on the point of preventing gelation during this preparation process. Furthermore, whatever method is used, it is desirable that an agent for preventing gelation such as hydroquinone, for example, be added in order to prevent gelation during reaction.

An oil-modified alkyd resin suitable for use in this invention has an oil length of 30 to 70%, preferably 55 to 65%. We have found that if the oil length is less than 30%, it will give rise to a lowering of resistance such as water resistance of the formed coating film. On the other hand, if this oil length is higher than 70%, it gives rise to undesirable results such as a lowering the hardness of the formed film at the initial stage of drying and a deterioration of the surface smoothness.

The content of the α,β-unsaturated monocarboxylic acid in the oil-modified alkyd resin which has been modified with the α,β-unsaturated monocarboxylic acid is 0.5 to 30% by weight, preferably 2 to 15% by weight. We have found that if this content is less than 0.5%, there will be no appreciable effect in improving the water resistance and hardness of the formed coating film. On the other hand, if this content exceeds 30%, gelation will very readily occur during the alkyd preparation, which will thereby become difficult.

The acid value of the oil-modified alkyd resin modified with the α,β-unsaturated monocarboxylic acid which is used in this invention is ordinarily of the order of 15 to 40, and the hydroxyl value is ordinarily from 20 to 150.

Inredient (B): polymerizable monomer

For this monomer, it is possible to use any monomer which is capable of undergoing radical polymerization, has at least one ethylenically unsaturated bond, and is capable of dissolving the above described ingredient (A) to a desired concentration as described in detail hereinafter. However, since it is desired to provide a resin composition which can be hardened at room temperature, a polymerizable monomer of high boiling point of an order exceeding 200° C. is especially preferred.

Specific examples of polymerizable monomers suitable for use as the ingredient (B) in this invention are as set forth below. These monomers can be used in combination as a mixture.

Monoacrylates and monomethacrylates of monohydric or polyhydric alcohols having 2 to 20, preferably 2 to 18 carbon atoms, preferably monoacrylates and monomethacrylates of monohydric and dihydric alcohols.

Specific examples of these monoacrylates and monomethacrylates are as set forth below. In the following list, the term "(meth)acrylate" means acrylate and methacrylate: 2-hydroxyethyl (meth)acrylate, 2-hydroxypropyl (meth)acrylate, 2-hydroxyethoxyethyl (meth)acrylate, 4-hydroxybutyl (meth)acrylate, 5-hydroxypentyl (meth)acrylate, 6-hydroxyhexyl (meth)acrylate, neopentylglycol mono(meth)acrylate, 3-butoxy-2-hydroxypropyl (meth)acrylate, 2-hydroxy-1- or -2-phenylethyl (meth)acrylate, polypropylene glycol mono(meth)acrylate, glycerine mono(meth)acrylate monohalfmaleate, diethyleneglycol mono(meth)acrylate, cyclohexyl (meth)acrylate, benzyl (meth)acrylate, 2-ethoxyethyl (meth)acrylate, 2-butoxyethyl (meth)acrylate, and tetrahydrofuryl (meth)acrylate.

Examples are di-, tri-, and tetraesters of alcohols each having at least two hydroxyl groups and having 2 to 20 carbon atoms, preferably 2 to 6 carbon atoms, preferably dihydric, trihydric, and tetrahydric alcohols and acrylic acid and methacrylic acid.

Specific examples of these di-, tri-, and tetra-acrylates and methacrylates are: ethyleneglycol di(meth)acrylate, diethyleneglycol di(meth)acrylate, 1,4-butanediol di(meth) acrylate, 1,6-hexanediol di(meth)acrylate, neopentylglycol di(meth)acrylate, trimethylolpropane tri(meth)acrylate, pentaerythritol tri(meth)acrylate, pentaerythritol tetra(meth)acrylate, and glycerine monoacrylate monomethacrylate.

It is possible to use any monomer having a relatively low boiling point, for example, styrene, methylmethacrylate and divinyl benzene.

Examples of particularly suitable polymerizable monomers for the ingredient (B) of this invention are: tetrahydrofuryl acrylate, 2-hydroxyethyl methacrylate, 2-hydroxypropyl acrylate, 3-butoxy-2-hydroxypropyl acrylate, 1,4-butanediol diacrylate, 1,6-hexanediol diacrylate, and trimethylolpropane tri(meth)acrylate. The solventless coating composition according to this invention contains the above described indispensable two ingredients (A) and (B) in a specific ratio.

The quantity of the ingredient (A) is from 30 to 70% by weight, preferably 40 to 60% by weight, of the total weight of these two ingredients (A) and (B). If this quantity exceeds 70%, the resin composition will acquire a remarkably high viscosity, and its preparation and utilization, for example, as a paint, will become difficult. On the other hand if this quantity is less than 30%, the water resistance, impact resistance, and bending resistance of the formed coating film will deteriorate.

The quantity of the ingredient (A) is from 30 to 70% by weight, preferably 40 to 60% by weight, of the total weight of these two ingredients (A) and (B).

To the above-mentioned composition comprising the oil-modified alkyd resin and the polymerizable monomer, there may be incorporated various additives, for instance, a coloring pigment such as titanium oxide, carbon black, iron oxide or ultramarine blue; a filler pigment such as talc, zinc white or barium sulfate; an anti-corrosive pigment such as minium, zinc powder or zinc chromate; a scaly pigment such as glass flakes, aluminum powder, mica or micaceous iron oxide; a coating film surface improver such as polyethylene glycol; a filler; a stabilizer; a pigment disperser; and a thixotropic agent.

The solventless type coating composition of this invention can be cured by using a curing catalyst, that is, a redox catalyst comprising an organic peroxide and a reducing agent and can be used, if necessary, in conjunction with a drier such as manganese naphthenate or cobalt naphthenate. Examples of curing catalysts are:

(a) A combination of methyl ethyl ketone peroxide and cobalt naphthenate;
(b) A combination of a redox catalyst comprising benzoyl peroxide and dimethylaniline and cobalt naphthenate or manganese naphthenate; and
(c) A combination of cyclohexanone peroxide and cobalt naphthenate.

Of these curing agent, cobalt naphthenate is particularly suitable because it not only participates as a reducing agent in radical generation but functions also as a driver participating also in the oxidation hardening of the oil-modified alkyd resin.

The above described catalyst is used in proportions of 0.5 to 5 parts by weight of the organic peroxide and of 0.01 to 5 parts by weight of the reducing agent relative to 100 parts by weight of the resin composition comprising (A) and (B).

The solventless coating composition is prepared firstly by adding pigments and additives to the resin component and uniformly mixing and dispersing the mixture by a conventional method for the preparation of a coating composition, for instance, by using a disperser, a roll mill, a sand mill or a ball mill, and then, prior to use, the curing catalyst is added thereto and mixed.

The solventless coating composition thus prepared is applied on the prime coat by a conventional coating method such as brush coating, roller coating, air spray coating or airless spray coating, and then cured at room temperature. The solventless coating composition is applied in an amount to obtain an average dried film thickness of from 20 to 500 $\mu$m, preferably from 40 to 350 $\mu$m, and then dried (polymerized) to form a finish coating film.

The solventless coating composition of the present invention is cured by radical-polymerization and oxidation-polymerization during the drying step to form a coating film.

According to the process of the present invention as described in the foregoing, the following effects will be obtained.

(1) It is possible to obtain a coating film having superior corrosion resistance.
(2) The coating film has extremely small oxygen permeability, whereby superior rust-preventive effect is obtainable. For instance, the oxygen-permeability of the finish coating film of the present invention is about 1/10 of that of a chlorinated rubber coating film as a conventional finish coating film.
(3) The internal curing of the primer coating is excellent and the finish coating composition is a solventless coating composition, whereby a high-build type coating is possible. Accordingly, the number of application operations can be substantially reduced. For instance, in the case of the conventional coating system, a total of four application operations are required including two applications for the primer coating of an oil-type and/or phthalic alkyd resin coating composition (35 $\mu$m$\times$2), one application for the intermediate coating of a phthalic alkyd resin coating composition (30 $\mu$m) and one application for a phthalic alkyd resin coating composition (25 $\mu$m), whereas according to the process of the present invention, the same film thickness as the conventional one can be obtained by one application for the primer coating (70 μm) and one application for the finish coating (55 μm). Thus, the number of coating operations can be reduced to a half. (4) When the finish coating composition of the present invention is coated on the primer coating, the "lifting" is thereby prevented.

Now, the present invention will be described in further detail with reference to Examples. However, it should be understood that the present invention is by no means restricted by these specific Examples.

In the Examples and Comparative Examples, "parts" or "%" refers to "parts by weight" or "% by weight", respectively.

PREPARATION OF PRIMER COATING COMPOSITIONS

The following primer coating compositions were prepared by using linseed oil (boiled oil, iodine value: 158-184, viscosity: 1.0-1.4 sp) as the vegetable oil, a phthalic alkyd resin varnish (residue upon heating: 70%, modified with soybean oil, phthalic anhydride content: 24±2%, oil length: 65±2%) as the phthalic alkyd resin, tricyclo[5,2,1,0$^{2,6}$]deca-4-ene-oxyethyl methacrylate (or dicyclopentenyl oxyethylmethacrylate, the structural formula as shown below) as the tricyclodecene derivative, and a mixed naphthenic acid drier comprising 12% of lead, 0.4% of cobalt and 0.8% of manganese, as the drier.

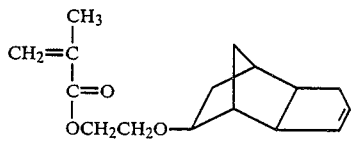

(1) Primer coating composition (A)

14.0 Parts of linseed oil, 13.0 parts of the phthalic alkyd resin varnish, 5.0 parts of the tricyclodecene derivative, 8.0 parts of an iron oxide red coloring pigment, 33.0 parts of calcium carbonate, 20.0 parts of lead suboxide powder, 0.3 part of methyl ethyl ketone oxime, 4.0 parts of mineral spirit, 2.7 parts of the drier and 0.8 part of an organic thixotropic agent, were mixed and then kneaded by rollers to obtain a primer coating composition (A).

(2) Primer coating composition (B)

8.0 Parts of linseed oil, 8.0 parts of the phthalic alkyd resin varnish, 2.0 parts of the tricyclodecene derivative, 78.0 parts of minium, 0.3 part of methyl ethyl ketone oxime, 2.0 parts of mineral spirit, 1.7 parts of the drier and 0.8 part of an organic thixotropic agent, were mixed and then kneaded by rollers to obtain a primer coating composition (B).

(3) Primer coating composition (C)

14.0 Parts of linseed oil, 13.0 parts of the phthalic alkyd resin varnish, 5.0 parts of the tricyclodecene derivative, 8.0 parts of an iron oxide red coloring pigment, 43.0 parts of calcium carbonate, 10.0 parts of aluminum polyphosphate, 0.3 part of methyl ethyl ketone oxime, 4.0 parts of mineral spirit, 2.7 parts of the drier and 0.8 part of an organic thixotropic agent, were mixed and then kneaded by rollers to obtain a primer coating composition (C).

(4) Primer coating composition (D)

26.0 Parts of linseed oil, 5.0 parts of the tricyclodecene derivative, 8.0 parts of an iron oxide red coloring pigment, 37.0 parts of calcium carbonate, 20.0 parts of lead suboxide powder, 0.5 part of methyl ethyl ketone oxime, 1.0 part of mineral spirit, 2.5 parts of the drier and 0.8 part of an organic thixotropic agent, were mixed and then kneaded by rollers to obtain a primer coating composition (D).

(5) Primer coating composition (E)

30.0 Parts of the phthalic alkyd resin varnish, 5.0 parts of the tricyclodecene derivative, 8.0 parts of an iron oxide red coloring pigment, 28.0 parts of calcium carbonate, 20.0 parts of lead suboxide powder, 0.5 part of methyl ethyl ketone oxime, 6.0 parts of mineral spirit, 2.5 parts of the drier and 0.8 part of an organic thixotropic agent, were mixed and then kneaded by rollers to obtain a primer coating composition (E).

(6) Primer coating composition (F)

17.0 Parts of linseed oil, 13.0 parts of the phthalic alkyd resin varnish, 2.0 parts of the tricyclodecene derivative, 8.0 parts of an iron oxide red coloring pigment, 33.0 parts of calcium carbonate, 20.0 parts of lead suboxide powder, 0.3 part of methyl ethyl ketone oxime, 4.0 parts of mineral spirit, 2.7 parts of the drier and 0.8 part of an organic thixotropic agent, were mixed and then kneaded by rollers to obtain a primer coating composition (F).

(7) Comparative primer coating compositions (I) to (V)

Comparative primer coating compositions (I) to (V) were prepared in the same manner as above with the formulations as shown in Table 1.

TABLE 1

| Formulations of comparative primer coating compositions (unit:part) | | | | | |
|---|---|---|---|---|---|
| | I | II | III | IV | V |
| Linseed oil | 19.0 | 10.0 | 19.0 | 31.0 | — |
| Phthalic alkyd resin varnish | 13.0 | 8.0 | 13.0 | — | 33.0 |
| Iron oxide red coloring pigment | 8.0 | — | 8.0 | 8.0 | 8.0 |
| Calcium carbonate | 33.0 | — | 43.0 | 37.0 | 28.0 |
| Lead suboxide powder | 20.0 | — | — | 20.0 | 20.0 |
| Minium | — | 78.0 | — | — | — |
| Aluminum polyphosphate | — | — | 10.0 | — | — |
| Methyl ethyl ketone oxime | 0.3 | 0.3 | 0.3 | 0.5 | 0.5 |
| Mineral spirit | 4.0 | 2.0 | 4.0 | 1.0 | 8.0 |
| Drier | 2.7 | 1.7 | 2.7 | 2.5 | 2.5 |
| Total | 100.0 | 100.0 | 100.0 | 100.0 | 100.0 |

(1) PREPARATION OF A RADICAL-POLYMERIZABLE AND OXIDATION-POLYMERIZABLE, ROOM TEMPERATURE CURING TYPE SOLVENTLESS COATING COMPOSITION (A)

Into a four-necked flask equipped with a stirrer, a water separator, a condenser and a nitrogen gas supply tube, 52.9 parts of soybean oil fatty acid, 14.9 parts of phthalic anhydride, 11.7 parts of MBTHP, 5.5 parts of glycerol and 15.1 parts of pentaerythritol were fed, and 0.1 part of hydroquinone and 4.0 parts of xylene were further added. Then, the mixture was reacted in a nitrogen gas stream at 220° C.

When the acid value of the formed alkyd reached 40, 7.1 parts of sorbic acid and 0.2 part of hydroquinone were added, and the reaction was continued until the acid value reached 20, whereby an oil-modified alkyd resin having a sorbic acid content of 7.1% and an oil length of 55.3% was obtained.

To 55.0 parts of the oil-modified alkyd resin, 10.0 parts of 2-hydroxypropyl acrylate and 35.0 parts of 1,4-butanediol diacrylate were added and stirred to obtan a resin composition (I) having a viscosity of 1.6 poise (25° C.).

To 65.0 parts of this composition (I), 10.0 parts of barium sulfate, 5.0 parts of talc and 20.0 parts of titanium oxide were mixed, and 0.001 part of a silicone-type anti-foaming agent, 0.4 part of an asbestos-type thixotropic agent, 0.5 part of cobalt naphthenate (metal content: 6%) and 0.12 part of methyl ethyl ketone oxime for preventing skinning and for the control of pot life, were further added thereto. The mixture was kneaded by rollers. Prior to use, 1 part of methyl ethyl ketone peroxide was added to obtain a solventless finish coating composition (A).

(2) PREPARATION OF A RADICAL-POLYMERIZABLE AND OXIDATION-POLYMERIZABLE, ROOM TEMPERATURE CURING TYPE SOLVENTLESS COATING COMPOSITION (B)

98.0 Parts of the above-mentioned resin composition (I), 0.98 part of cobalt naphthenate (metal content: 6%), 0.15 part of methyl ethyl ketone oxime, 0.001 part of a silicone-type anti-foaming agent and 0.4 part of an asbestos-type thixotropic agent were mixed and stirred. Immediately prior to use, 1.7 parts of methyl ethyl ketone peroxide and 66.4 parts of an aluminum paste were added thereto to obtain a solventless coating composition (B).

(3) PREPARATION OF A RADICAL-POLYMERIZABLE AND OXIDATION-POLYMERIZABLE, ROOM TEMPERATURE CURING TYPE SOLVENTLESS COATING COMPOSITION (C)

The reaction was conducted in the same manner as in the case of the above resin composition (I) except that 56.5 parts of dehydrated castor oil fatty acid, 15.0 parts of phthalic anhydride, 11.9 parts of MBTHP, 6.7 parts of glycerol, 13.5 parts of pentaerythritol and 3.5 parts of crotonic acid were used, whereby an oil-modified alkyd resin having a crotonic acid content of 3.5% and an oil length of 59.0% was obtained.

To 55.0 parts of the oil-modified alkyd resin, 10.0 parts of 2-hydroxypropyl acrylate and 35.0 parts of 1,4-butanediol diacrylate were added, stirred and dissolved to obtain a solventless resin composition (II) having a viscosity of 2.3 poise (25° C.).

Immediately prior to use, 1.7 parts of methyl ethyl ketone peroxide and 66.7 parts of an aluminum paste were added to this composition (II) to obtain a solventless coating composition (C).

(4) PREPARATION OF A RADICAL-POLYMERIZABLE AND OXIDATION-POLYMERIZABLE, ROOM TEMPERATURE CURING TYPE SOLVENTLESS COATING COMPOSITION (D)

The reaction was conducted in the same manner as in the case of the above resin composition (I) except that 54.6 parts of dehydrated castor oil fatty acid, 15.1 parts of phthalic anhydride, 12.0 parts of MBTHP, 7.7 parts of glycerol, 12.1 parts of pentaerythritol and 5.4 parts of 2-($\beta$-furyl)acrylic acid were used, whereby an oil-modified alkyd resin having an acid value of 20, a 2-($\beta$-furyl)acrylic acid content of 5.4% and an oil length of 57.1% was obtained.

To 55 parts of the oil-modified alkyd resin, 10.0 parts of 2-hydroxypropyl acrylate and 35.0 parts of 1,4-butanediol diacrylate were added, stirred and dissolved to obtain a solventless resin composition (III) having a viscosity of 2.5 poise (25° C.).

To 65 parts of this composition (III), 10.0 parts of talc, 5.0 parts of barium sulfate, 20.0 parts of titanium oxide, 0.7 part of cobalt naphthenate (metal content: 6%), 0.09 part of methyl ethyl ketone oxime, 0.001 part of a silicone-type anti-foaming agent and 0.3 part of an asbestos-type thixotropic agent, were added, and the mixture was kneaded by rollers. Prior to use, 1 part of methyl ethyl ketone peroxide was added thereto to obtain a solventless coating composition (D).

(5) PREPARATION OF A COMPARATIVE FINISH COATING COMPOSITION (I)

40.0 Parts of a soybean oil-modified alkyd resin varnish (oil length: 60%, a mineral spirit solution containing 60% of a non-volatile component), 25.0 parts of titanium oxide, 25 parts of barium sulfate, 0.4 part of methyl ethyl ketone oxime, 2.0 parts of the drier, 1.3 parts of an additive and 6.3 parts of mineral spirit, were kneaded by rollers to obtain a comparative finish coating composition (I).

COMPARATIVE TEST 1

With respect to the above-mentioned primer coating compositions (A) to (F) and the comparative primer coating compositions (I) to (V), comparative tests were conducted for the high-build type coating property and the lifting property. The results are shown in Table 2.

TABLE 2

| Type of the primer coating composition | High-build type coating property and lifting property of prime coat | | | | | | | | | | |
|---|---|---|---|---|---|---|---|---|---|---|---|
| | Prime coat according to the present invention | | | | | | Comparative prime coat | | | | |
| | (A) | (B) | (C) | (D) | (E) | (F) | (I) | (II) | (III) | (IV) | (V) |
| High-build type coating property (1) (dried film thickness) | | | | | | | | | | | |
| 35 μm | Good | Good | Good | Good | Good | Good | Good | Good | Good | Good | Good |
| 50 μm | " | " | " | " | " | " | Slightly wrinkled | Slightly wrinkled | Slightly wrinkled | Slightly wrinkled | Slightly wrinkled |
| 100 μm | " | " | " | " | " | " | Substantially wrinkled | Substantially wrinkled | Substantially wrinkled | Substantially wrinkled | Substantially wrinkled |
| 150 μm | " | " | " | " | " | " | Substantially | Substantially | Substantially | Substantially | Substantially |

TABLE 2-continued

High-build type coating property and lifting property of prime coat

| Type of the primer coating composition | Prime coat according to the present invention | | | | | | Comparative prime coat | | | | |
| --- | --- | --- | --- | --- | --- | --- | --- | --- | --- | --- | --- |
| | (A) | (B) | (C) | (D) | (E) | (F) | (I) | (II) | (III) | (IV) | (V) |
| 180 μm | " | " | " | " | " | " | wrinkled Substantially wrinkled | wrinkled Substantially wrinkled | wrinkled Substantially wrinkled | wrinkled Substantially wrinkled | wrinkled Substantially wrinkled |
| Lifting property[(2)] 60 μm | None | None | None | None | None | None | Occurred | Occurred | Occurred | Occurred | Occurred |

[(1)]The primer coating composition was applied on a polished steel plate of 0.8 × 70 × 150 mm by a variable applicator, to obtain the predetermined film thickness, and then dried naturally at 20° C. under a relative humidity of 75% for 24 hours, whereupon the surface condition of the coating film was examined.

[(2)]After the application of the primer coating in a thickness of 60 μm, the coated steel plate was left to stand at room temperature for 24 hours, and then the solventless coating composition (A) of the present invention was applied thereon in a thickness of 100 μm and then left to stand for 24 hours, whereupon the coating condition was examined. The one where lifting (e.g. wrinkle) was observed, was designated as "occurred", and the one where no lifting was observed, was designated as "none".

COMPARATIVE TEST 2

With respect to the solventless coating compositions (A) to (D) and the comparative finish coating composition (I), comparative tests were conducted for the high-build type coating property. The results thereby obtained are shown in Table 3.

TABLE 3

High-build coating property of the finish coating film

| Type of the finish coating composition | | Finish coating films according to the present invention | | | | Comparative finish coating film (I) |
| --- | --- | --- | --- | --- | --- | --- |
| | | (A) | (B) | (C) | (D) | |
| High-build coating property (dried film thickness) | 35 μm | Good | Good | Good | Good | Good |
| | 50 μm | " | " | " | " | Slightly wrinkled |
| | 100 μm | " | " | " | " | Substantially wrinkled |
| | 150 μm | " | " | " | " | Substantially wrinkled |
| | 180 μm | " | " | " | " | Substantially wrinkled |

EXAMPLES 1 to 6 and COMPARATIVE EXAMPLES 1 to 5

A primer coating composition was applied on a sand blasted steel sheet (1.6×70×150 mm) by air spray coating to provide a predetermined dried film thickness, and then left to stand at room temperature (20° C.) for 2 days. Then, a finish coating composition was applied in the same manner and left to stand at room temperature for 10 days.

The types of the coating compositions and the number of coating operations were as shown in Table 4.

Into the coating film surface thereby obtained, cross cut lines reaching the substrate were cut, and the test piece was subjected to a salt spray test (JIS K-5400, 7.8). The results thereby obtained are also shown in Table 4.

TABLE 4

Coating systems and salt water spray test

| | Examples | | | | | |
| --- | --- | --- | --- | --- | --- | --- |
| | 1 | 2 | 3 | 4 | 5 | 6 |
| Type; Film thickness; Number of coating applications of primer coating composition | Primer coating (A) 50 μm 1 time | Primer coating (B) 70 μm 1 time | Primer coating (C) 70 μm 1 time | Primer coating (D) 60 μm 1 time | Primer coating (E) 60 μm 1 time | Primer coating (F) 100 μm 1 time |
| Type; Film thickness; Number of coating applications of finish coating composition | Finish coating (A) 45 μm 1 time | Finish coating (A) 55 μm 1 time | Finish coating (B) 55 μm 1 time | Finish coating (C) 100 μm 1 time | Finish coating (D) 60 μm 1 time | Finish coating (D) 150 μm 1 time |
| Total film thickness | 95 μm | 125 μm | 125 μm | 160 μm | 120 μm | 250 μm |
| Salt water spray property | | | | | | |
| 300 hr | No change | No change | No change | No change | No change | No change |
| 800 hr | " | " | " | " | " | " |
| 1200 hr | " | " | " | " | " | " |

| | Comparative Examples | | | | |
| --- | --- | --- | --- | --- | --- |
| | 1 | 2 | 3 | 4 | 5 |
| Type; Film thickness; Number of coating applica- | Primer coating (I) 35 μm | Primer coating (II) 35 μm | Primer coating (III) 35 μm | Primer coating (IV) 35 μm | Primer coating (V) 35 μm |

TABLE 4-continued

| Coating systems and salt water spray test | | | | | |
|---|---|---|---|---|---|
| tions of primer coating composition | 2 times | 2 times | 2 times | 2 times | 2 times |
| Type; Film thickness; Number of coating applications of finish coating composition | Finish coating (I) 30 μm/1 time 25 μm/1 time | Finish coating (II) 30 μm/1 time 25 μm/1 time | Finish coating (I) 30 μm/1 time 25 μm/1 time | Finish coating (I) 30 μm/1 time 25 μm/1 time | Finish coating (I) 30 μm/1 time 25 μm/1 time |
| Total film thickness | 125 μm | 125 μm | 125 μm | 125 μm | 125 μm |
| Salt water spray property | | | | | |
| 300 hr | Rust slightly formed | Rust slightly formed | Rust slightly formed | Rust slightly formed | Rust slightly formed |
| 800 hr | Rust substantially formed | Rust substantially formed | Rust substantially formed | Rust substantially formed | Rust substantially formed |
| 1200 hr | Rust formed about 80% | Rust formed about 80% | Rust formed about 80% | Rust formed about 80% | Rust formed about 80% |

From the above comparative test results, it is evident that the prime coat obtainable by the process of the present invention is superior in the high-build type coating property and free from lifting. Likewise, the finish coating film obtained by the present invention is superior in the high-build type coating property.

Thus, according to the present invention, the number of coating operations required to obtain the same film thickness can be reduced to a half as compared with the conventional method, whereby it is possible to substantially reduce the cost for the coating. Furthermore, the formed coating layer obtained from the specific coating system of the present invention, has a superior corrosion resistance.

We claim:

1. A process for forming a corrosion resistant high-build type coating film, which comprises (i) a step of priming on a substrate a coating composition comprising (a) 100 parts by weight of a mixture composed of from 99.9 to 60% by weight of a vegetable oil and/or a phthalic alkyd resin, and from 0.1 to 40% by weight of tricyclodecene and/or its derivative, and (b) from 1 to 500 parts by weight of at least one member selected from the group consisting of an oxyacid salt, and metal lead and its oxide and salt, followed by drying it to form a prime coat, and (ii) a step of applying thereon a radical-polymerizable and oxidation-polymerizable, room temperature curing type solventless coating composition, and polymerizing it to form a cured coating film.

2. The process according to claim 1, wherein the vegetable oil is linseed oil, soybean oil or Chinese tung oil.

3. The process according to claim 1 wherein the phthalic alkyd resin has an oil length of from 40 to 80% and a phthalic anhydride content of at most 25% by weight.

4. The process according to claim 1, wherein tricyclodecene and/or its derivative is at least one compound selected from the group consisting of dicyclopentenyloxyethyl acrylate, dicycloopentenyloxyethyl methacrylate, dicyclopentenyl acrylate and dicyclopentenyl methacrylate.

5. The process according to claim 1, wherein the oxyacid salt is at least one member selected from the gorup consisting of salts of phosphoric acid, boric acid, molybdic acid and chromic acid with zinc, lead and aluminum.

6. The process according to claim 1, wherein the metal lead and its oxide and salt are at least one member selected from the group consisting of metal lead, lead suboxide, lead monoxide, lead dioxide, trilead tetraoxide, white lead, lead cyanamide, calcium plumbate, basic lead sulfate and basic lead chromate.

7. The process according to claim 1, wherein the radical-polymerizable and oxidation-polymerizable, room temperature curing type solventless coating composition is composed essentially of a curing catalyst and a resin component comprising (A) from 30 to 70% by weight of an oil-modified alkyd resin having an oil length of from 30 to 70% and modified with an $\alpha,\beta$-unsaturated monocarboxylic acid selected from the group consisting of sorbic acid, crotonic acid and 2-($\beta$-furyl)acrylic acid, the content of the $\alpha,\beta$-unsaturated monocarboxylic acid in the alkyd resin being from 0.5 to 30% by weight, and (B) from 70 to 30% by weight of a polymerizable monomer in which the ingredient (A) is dissolved.

* * * * *